Jan. 31, 1933.  E. J. LOCKWOOD  1,895,886
APPARATUS FOR MANUFACTURING SOLID CARBON DIOXIDE
Filed March 22, 1930
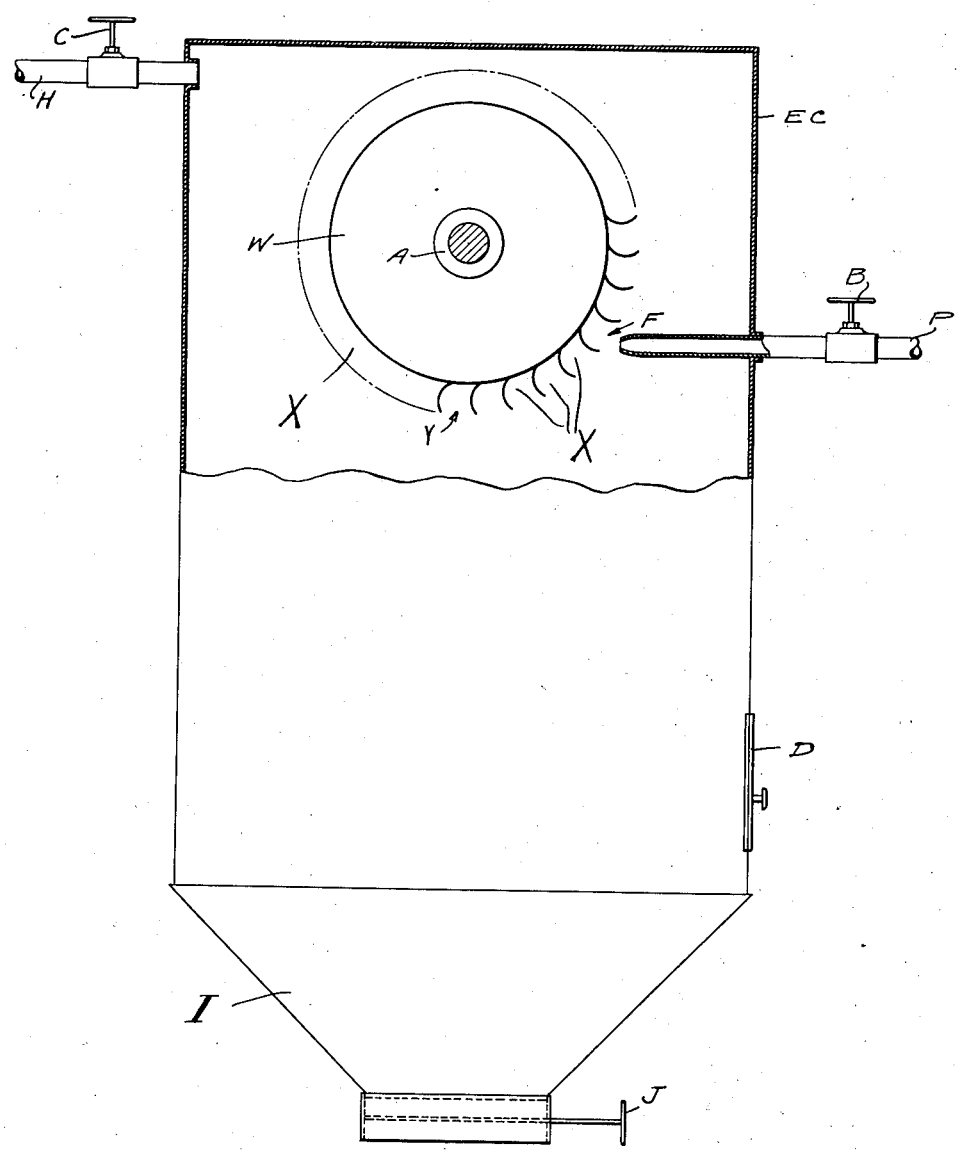
INVENTOR
BY
ATTORNEY Patented Jan. 31, 1933

1,895,886

UNITED STATES PATENT OFFICE

EDWIN J. LOCKWOOD, OF PEEKSKILL, NEW YORK, ASSIGNOR TO THE BORDEN COMPANY, OF NEW YORK, N. Y., A CORPORATION OF NEW JERSEY

APPARATUS FOR MANUFACTURING SOLID CARBON DIOXIDE

Application filed March 22, 1930. Serial No. 438,011.

It is an object of my present invention to produce an apparatus by which a much greater percentage of solid carbon dioxide may be recovered, as such, from any given volume of liquid or gaseous carbon dioxide than that obtained by any former methods. I accomplish this in a very simple and inexpensive manner and in fact, it is my further object to recover, in the form of power, a considerable amount of the initial energy imparted to any present process of producing solid carbon dioxide whilst simultaneously increasing the percentage of recovery thereof.

In the usual commercial process of producing solid carbon dioxide by permitting the gas or liquid under pressure to expand into a conventional type of expansion chamber, less than half of the original material is recovered in solid form. The remainder is returned into the cycle and recompressed. Also in the process disclosed in my co-pending application, process of manufacturing liquid carbon dioxide, filed July 5th, 1929, bearing Serial No. 376,101, wherein a gaseous mixture of carbon dioxide and nitrogen is compressed and reduced in temperature to the point where precipitation of the carbon dioxide constituent takes place in the expansion chamber, I find that in a conventional type of expansion chamber sufficient cold cannot be obtained due to the pressure drop alone to freeze out all of the carbon dioxide constituents. I must therefore further reduce the temperature obtainable in the various stages of my cycle, involving greater power, increased cost of apparatus and difficulties in operation. Even then I find that in working in such low temperatures there is a tendency to create solidified carbon dioxide in the various connecting pipes with consequent blocking and complete breakdown of the cycle so that no gas whatever is delivered to the expansion chamber.

The other alternative then, both for such a system as disclosed by me in my said co-pending application, and in any system using an expansion chamber for obtaining carbon dioxide in solid form is to reduce the temperature in the chamber itself, apart from the temperature drop obtaining as a result merely of pressure drop.

My object then is to accomplish this by utilizing the energy of the expanding gas or liquid in the form of mechanical power with the consequent and necessary additional absorption of heat from the gas or liquid incident to any such transfer of energy. At once it becomes apparent that I may return such mechanical power to and for use in my power requirements for the refrigeration cycle itself and/or for any other power requirement; I may control the rate of use of such additional power and concurrently control the rate of absorption of heat from the expanding gas or liquid by reason of its loss of pressure in the performance of the work necessary to operate my mechanical power engine, of whatever type I may select. If given a highly efficient mechanical power engine or heat engine and efficient units in my refrigerator cycle, I may restore over half of the power initially employed in my refrigeration cycle and produce a greater amount of solid carbon dioxide in my expansion chamber relatively to the initial amount of the gas or liquid involved than has been produced by former methods of making solid carbon dioxide.

The reason the usual commercial system of obtaining solid carbon dioxide in an expansion chamber is inefficient is because it depends upon the pressure drop between incoming pressure and the atmospheric pressure of the chamber. Such a theoretical drop never completely exists as the incoming pressure is always present and is effective throughout a considerable area of the chamber. By utilizing the velocity due to the incoming pressures to produce mechanical power, I obtain enormous increases in the temperature drop in the chamber. I may incidentally also control the rate of pressure change but I advance this as a theory merely, and am not bound by it. Analogous to my process is the utilization of steam in a steam turbine which absorbs the heat of the gas, transferring it into useful mechanical power and results in its complete loss of heat and its transfer back to the liquid state of water if a sufficient number of applications are made in successive stages of turbines.

The drawing is a diagrammatic view disclosing one method of practising my invention.

An expansion chamber EC is connected by inlet pipe P equipped with valve B, to a source of gaseous or liquid carbon dioxide or to a mixture of the same with nitrogen or other gases as in the case of my said copending application. The interior end F of this pipe constitutes a suitable nozzle which is in operable spaced relationship with the vanes V or a turbine wheel W mounted on its axis A and free to rotate within the chamber. The operable space X is dependent on a number of factors such as the type of vane, nozzle, gas pressure, velocity of impact, etc. The axis A is connected through the walls of the chamber on bearings to an electrical generator, brake, motor or other power delivery device (not shown). The chamber is provided with a suitable exhaust pipe H having valve C through which may pass the excess gases. An access D will of course also be necessary for removing the solid carbon dioxide although it is possible to have a hopper arrangement I with valve J if desired.

It must of course be understood that I am not limited to the type of turbine, whether undershot or overshot, or type of vanes. In fact I am not limited to a turbine but may use any form of heat engine capable of accomplishing my objects.

The operation of my process is exceedingly simple. A supply of free or mixed carbon dioxide gas or liquid under pressure, running as high as say 1600 lbs. per square inch is released through the pipe P against the vanes V and the impact due to the velocity of the released pressure causes the wheel to turn. This creates an absorption of heat from the gas in addition to the heat lost inherently by reason of the difference in pressure head between the incoming gas and the chamber pressure. The wheel transfers its power through the axle to outside the chamber and solid carbon dioxide snows down from the vanes into the chamber. The power recovered is available for use in the refrigeration cycle and the objects of my invention are accomplished.

Having thus described my invention what I claim and desire to secure by United States Letters Patent is:

1. An apparatus for use in converting carbon dioxide under pressure into the solid state comprising an expansion chamber, a pipe for conducting the carbon dioxide under pressure into the chamber at a point permitting the resulting solid carbon dioxide to fall to the bottom of the chamber, and a turbine engine in the chamber having its vanes arranged to be struck by the stream of carbon dioxide entering the chamber.

2. An apparatus for use in recovering solid carbon dioxide from a compressed gaseous mixture containing carbon dioxide comprising an expansion chamber, a turbine engine located in the upper part of the chamber, a pipe for leading the compressed gaseous mixture into the chamber, the outlet orifice of said pipe being located so as to discharge the mixture against the vanes of the engine to drive the engine, and an outlet pipe for gas located in the upper end of the chamber.

In witness whereof, I have hereunto set my hand to these specifications this 18th day of March, 1930.

EDWIN J. LOCKWOOD.